(12) United States Patent
Bowers et al.

(10) Patent No.: US 6,233,073 B1
(45) Date of Patent: May 15, 2001

(54) DIAGNOSTIC INJECTION OF TRANSMISSION ERRORS IN FIBER OPTIC NETWORKS

(75) Inventors: Michael Dana Bowers, San Jose, CA (US); Donald Eugene Denning, Tucson, AZ (US); Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/124,837

(22) Filed: Jul. 30, 1998

(51) Int. Cl.[7] .................................................. H04B 10/08
(52) U.S. Cl. ........................................ 359/110; 370/244
(58) Field of Search .................................. 359/110, 177; 370/242, 248, 249

(56) References Cited

U.S. PATENT DOCUMENTS

| 5,228,105 | 7/1993 | Glista ..................................... 385/89 |
| 5,229,875 | 7/1993 | Glista ..................................... 359/110 |
| 5,321,813 | 6/1994 | McMillen et al. .................... 395/200 |
| 5,396,357 | 3/1995 | Goossen et al. ..................... 359/119 |
| 5,524,218 | 6/1996 | Byers et al. .......................... 395/309 |
| 5,559,963 | 9/1996 | Gregg et al. ...................... 395/200.13 |
| 5,602,667 | 2/1997 | Patel ..................................... 359/161 |
| 5,706,278 | 1/1998 | Robillard et al. .................... 370/222 |
| 5,774,242 | * | 6/1998 | O'Syllivan ........................... 359/110 |

* cited by examiner

Primary Examiner—Jason Chan
Assistant Examiner—Chau M. Nguyen
(74) Attorney, Agent, or Firm—John H. Holcombe; Robert M. Sullivan

(57) ABSTRACT

Disclosed are a subsystem and a method for diagnosing a fiber optic network, the fiber optic network comprising a fiber having an optic stream adhering to a defined protocol of the fiber optic network, and comprising a target for receiving and responding to the optic stream. The diagnosis comprises receiving the fiber optic stream and converting the fiber optic stream to an electrical input stream with a FOSA (fiber optic subassembly), and recognizing, from the electrical input stream, a selected event (e.g., frame or command) related to the optic stream defined protocol. Then, in response to the recognition of the selected event, recognizing a selected pattern of the electrical input stream, e.g., employing mask logic, and injecting, in response to the recognition of the selected pattern, a transmission error into the optic stream, and transmitting the optic stream with the injected transmission error to the target, employing a FOSA. A FIFO buffer is coupled to the first FOSA for buffering the electrical input stream, and the mask logic is coupled to the FIFO buffer for injecting the transmission error at a selected point in the optic stream.

20 Claims, 3 Drawing Sheets

DIAGNOSTIC INJECTION OF TRANSMISSION ERRORS IN FIBER OPTIC NETWORKS

TECHNICAL FIELD

This invention relates to high speed fiber optic networks having built in protection against faults, and, more particularly, to the testing of such networks for fault tolerance and error recovery.

BACKGROUND OF THE INVENTION

Fault tolerance presents one of the greatest challenges to the design of modern high speed fiber optic networks. Unlike earlier point-to-point fiber optic subsystems, such as ESCON, for connecting computer systems, the modern fiber optic networks include interfaces which can handle a variety of different classes of transfers, for example, as defined for the "Fibre Channel" fiber optic network: Class 1—Dedicated connection (point-to-point); Class 2—Frame multiples (shared but guaranteed); Class 3—Datagram (ship-and-pray); and Class 4—Lossy voice and video. The characteristics of the interfaces are implemented in standard protocols, and will support many different transfer mechanisms, such as modern ESCON, FC, SSA, ATM, and FDDI protocols, to name a few. These protocols all employ a similar serial transport layer, comprising a "Fiber Optic Subassembly" (FOSA), fiber, and encoding/decoding modules. They are designed to be fast, dependable, and cover great distances, linking computer systems and components that are in different rooms, buildings and cities.

Demands on such links and networks have required that data availability and integrity be an important part of any network component design. As components have become more reliable, redundant, and fault tolerant, the interfaces linking these components or systems are now typically the most failure-prone aspect.

Hence, in order to provide error detection capabilities, most fiber optic protocols incorporate the IBM 8 to 10 bit encoding scheme with running disparity. This arrangement is described in the IBM Journal of Research and Development, volume 27, number 5, Sep. 1983, pp. 440–450, A. X. Widmer and P. A. Franazek, "A DC-Balanced, Partition-Block, 8B/10B Transmission Code" (herein, the Widmer and Franazek publication). There are also other checks built in to these protocols, providing several layers of protection. Many of the checks are logic circuits to detect that the frames are complete and that the protocols are correct.

Additionally, circuits are provided for assuring a level of error detection. For example, U.S. Pat. No. 5,229,875, Glista, provides a fiber optic coupler-repeater which analyzes the power of the optical signals from upstream terminals and compares the signal power to a preset value range and rejects those out of the range, activating a built-in "test circuit" alarm telling downstream terminals of the failure. As another example, U.S. Pat. No. 5,396,357, Goosen et al., describes a cross-channel data link which includes wavelength division multiplexing in opposite directions and logic circuity that "guarantees" that the interconnected systems have identical data irrespective of any single point failure in the data link.

SUMMARY OF THE INVENTION

It is an object of the present invention to verify that a fault tolerant fiber optic network design has successfully implemented error detection schemes.

Disclosed are a subsystem and a method for diagnosing a fiber optic network, the fiber optic network comprising a fiber having an optic stream adhering to a defined protocol of the fiber optic network, and comprising a target for receiving and responding to the optic stream. The diagnosis comprises receiving the fiber optic stream and converting the fiber optic stream to an electrical input stream with a FOSA (fiber optic subassembly), and recognizing, from the electrical input stream, a selected event related to the optic stream defined protocol. Then, in response to the recognition of the selected event, recognizing a selected pattern of the electrical input stream, preferably employing mask logic, and injecting, in response to the recognition of the selected pattern, a transmission error into the electrical stream and converted into the optic stream, and transmitting the optic stream with the injected transmission error to the target, employing a FOSA.

A FIFO buffer is coupled to the first FOSA for buffering the electrical input stream, and the mask logic is coupled to the FIFO buffer for injecting the transmission error at a selected point in the optic stream.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
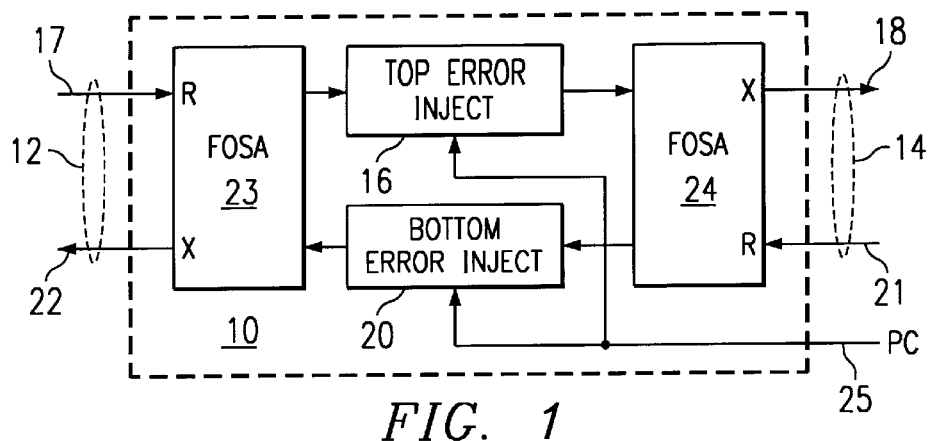
FIG. 1 is a block diagram representation of an embodiment of a diagnostic error injection subsystem in accordance with the present invention.

Referring to FIG. 1, an embodiment of an error injection subsystem 10 in accordance with the present invention is illustrated inserted in a fiber 12 and 14 of a fiber optic network. The embodiment illustrated is bidirectional, having a top error inject subsystem 16 for injecting errors in the optic stream from source 17 for transmission to a target 18, and having a bottom error inject subsystem 20 for injecting errors in the optic stream from source 21 for transmission to a target 22.

The error injection subsystem 10 includes FOSAs (Fiber Optic Subassemblies) 23 and 24 to interface with the fiber 12 and 14 at each end of the fiber. The FOSAs each include an optical transmitter and receiver to convert the optical stream to electrical and vice versa. The error inject subsystems are each coupled to a PC or workstation 25 and receive commands and information therefrom. The PC or workstation may comprise an IBM PC or a workstation such as an IBM RS/6000.

For a simplified description of the error injection subsystem of the invention, only one of the error injection subsystems 16 will be described in detail, the reverse direction subsystem 20 being identical.

Figure 2:
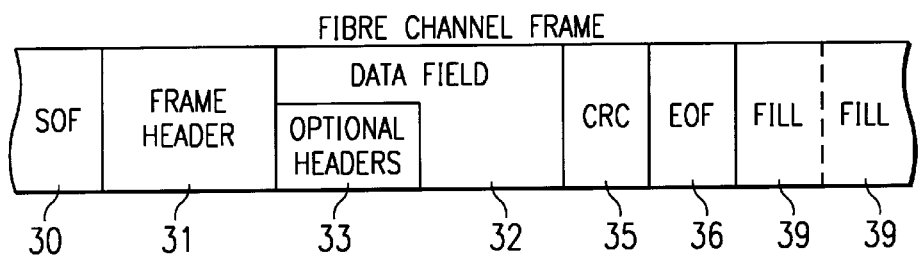
FIG. 2 is a representation of a frame of optical data adhering to the Fibre Channel protocol.

FIG. 2 illustrates a standard Fibre Channel frame, with a SOF area 30 which indicates the Class of the frame, as described above, etc. Then, a header 31 indicates the "ID" of the destination and the "ID" of the source, together with control information indicating, for example, the type of frame, whether the frame belongs in a chain of frames, etc. The data field 32 may include optional headers 33 which may relate to security, network information, etc. The frame ends with a CRC (cyclic redundancy check) 35 and an EOF area 36. Fill words 39 may separate frames. Idle characters are typically sent when no frames are being sent over the fiber. Also typically, all of the information is encoded with the 8/10 code, which expands 8 bits of input data to a limited number of 10 bit patterns in accordance with the Widmer and Franazek publication. A key element of the 8/10 code is that it is DC balanced. As the result, the idle characters comprise a four character ordered set having a total of 40 bits. Frame delimiters, such as SOF, EOF, etc., comprise continuous sequences, most often of two characters, one a delimiter character, and the other a data character characterizing the delimiter type.

In accordance with the present invention, in the error inject subsystem, for example, subsystem 16 of FIG. 1, transmitted frames and special characters of the optical stream 17 are deserialized, decoded, buffered and monitored. When the monitoring indicates the desired frame or special characters are present for a test, selected bytes in the buffered frame or related to the special characters are then recognized and changed to inject a transmission error and the resultant optical stream is transmitted to the target 18 and the subsystem reverts to a passive monitor.

Figure 3:
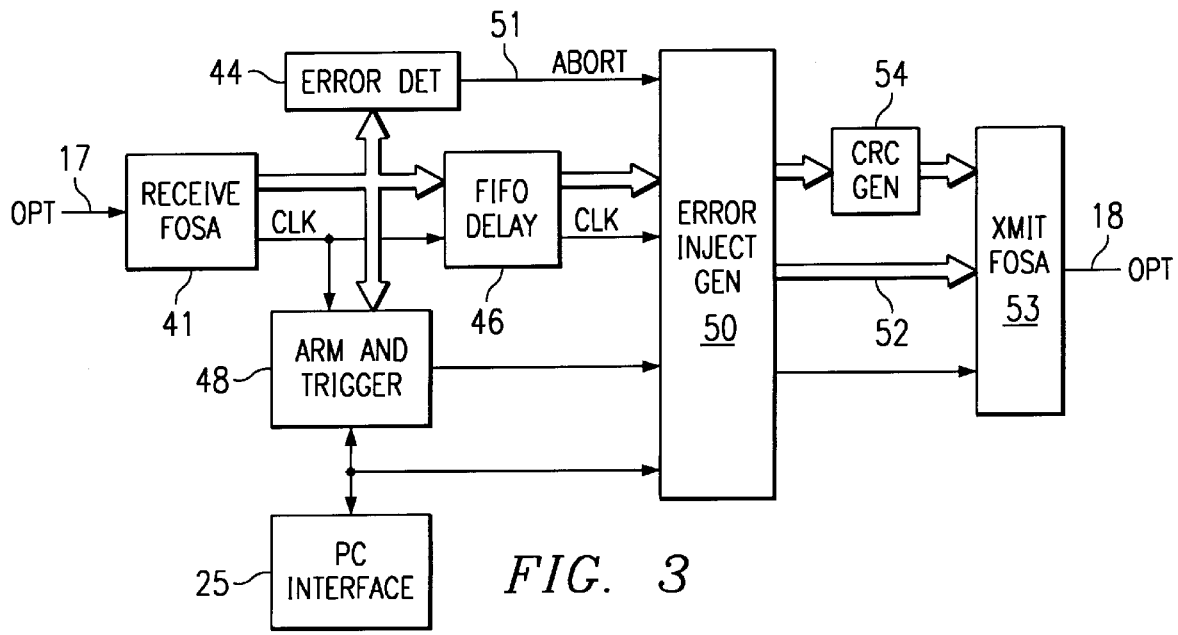
FIG. 3 is a block diagram of the internal architecture of a diagnostic error injection subsystem of FIG. 1.

FIG. 3 illustrates the internal architecture of a diagnostic error injection subsystem of FIG. 1. A serial optical input, for example input 17 in FIG. 1, is coupled to a receiver 41. The receiver 41 includes the receive section of the FOSA, converting the optical signal to electrical, and also includes a deserializer and decoder. The resultant parallel electrical information is supplied to an error detector 44, a FIFO delay 46 and arm and trigger logic 48. The FIFO 46 may, for example, comprise a 256 stage by 10 bit buffer to buffer up to the last 256 characters received, including special characters. It is a delay mechanism that allows errors to be injected on characters that were received before the trigger of a specific set of characters was detected.

The arm and trigger logic 48 monitor the input and determine if selected criteria of the input is met. The selection characteristics are provided by the PC input at interface 25, and, if the selection criteria is met, a specific set of characters, etc., is detected, and an error injection generator 50 is operated to inject the error at selected location in the delayed input of FIFO delay 46, the location being related to the detected specific set of characters. For example, the error may be injected as a substitution for the detected specific set of characters.

The error detector 44, detects, in accordance with the Fibre Channel standard or the CRC of the frame, any error in the input data from input 17. The SERDES module in the receiver 41 also detects loss of light, and this error is passed on to the error detector. Should an input error be present, it is preferred that no additional test or diagnostic error be implemented. Thus, the detection of any error in the input by error detector 44 is signaled on line 51 and aborts the error injection of error injection generator 50.

The resultant output is provided on output 52 to transmitter 53. Additionally, the resultant output is provided to CRC generator 54 so that, if the content of the frame were to be changed, and a new CRC required, the new CRC is generated by the generator 54. The transmitter 53 includes an 8 to 10 bit encoder, a serializer, and a FOSA including an electrical to optical converter, providing the output on the optical fiber, for example, fiber 18 of FIG. 1.

Figure 4:
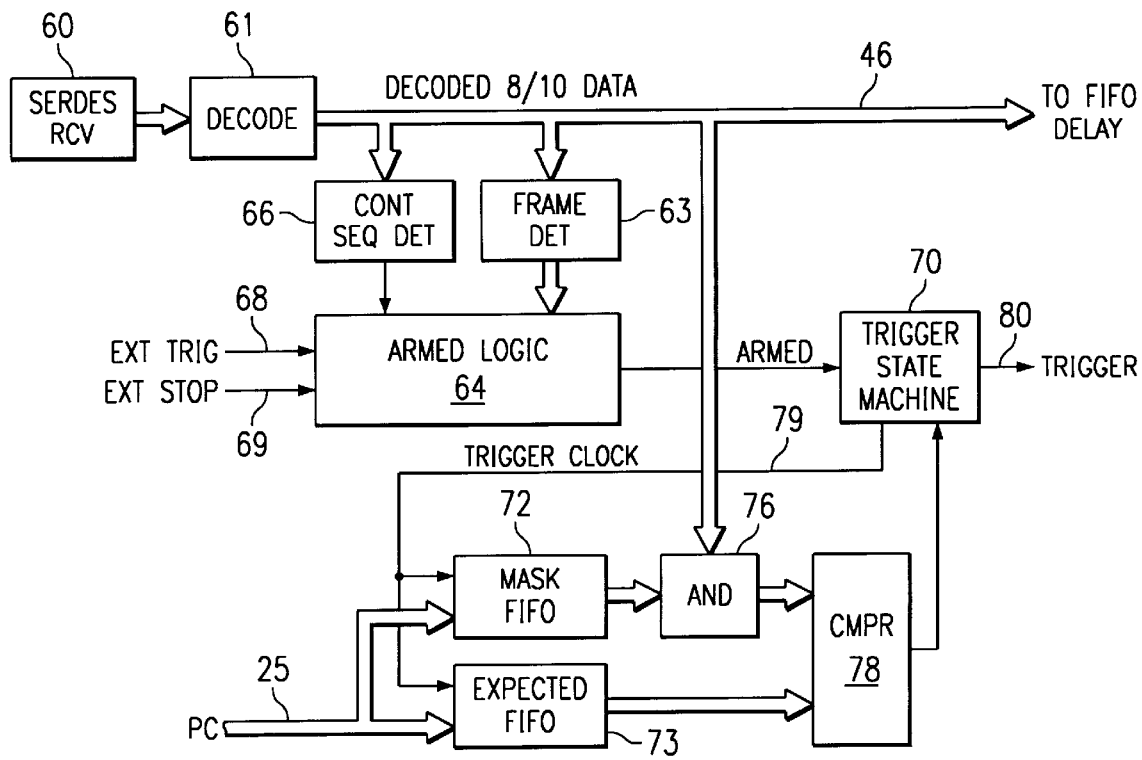
FIG. 4 is a block diagram of the error injection arming and trigger of the diagnostic error injection subsystem of FIGS. 1 and 3.

FIG. 4 illustrates an embodiment of arming and trigger hardware 48 and some of the associated circuitry of FIG. 3. A deserializer (SERDES) 60 and a decoder 61 are those incorporated in receiver 41 of FIG. 3. The deserializer is part of a SERDES module and passes the input to the decoder in 10 bit blocks. The decoder 61 receives the 10 bit blocks and does character alignment (synchronization), and then decodes the aligned 10-bit characters and looks for code violations. Code violations may be sensed as input errors and passed to the error detector 44 in FIG. 3. The outputs of the decoder are 8-bit decoded data, and special characters are identified as such.

A frame detector 63 detects frame delimiters, such as SOF, EOF, IDLE, and provides a CRC check of the incoming data. The detected delimiters are provided to armed logic 64. The armed logic 64 is a portion of the arm and trigger 48 of FIG. 3. A continuous sequence detector 66 detects any programmed two character sequence. The output stays on as long as the two character sequence continues. Normally, the continuous sequence is a special character or delimiter, and the continuous sequence detector 66 gates the output of the frame detector 63 (which detects the frame delimiters, etc., to the armed logic 64.

The armed logic 64 receives the outputs of frame detector 63 as gated by continuous sequence detector 66, and recognizes a user selected arm sequence, or selected event, related to the optic stream defined protocol. The event may be selected at the PC 25 or from another external source, such as another error injection from the error inject generator 50 in FIG. 3, on line 68.

Examples of user selected events are a continuous sequence that indicates the beginning of a frame or a special character. Examples are, an SOF for a selected type of frame, the combination of an external trigger and any SOF, a SOF as defined by a previous insert, a special character, etc. Once the armed state is reached, the "abort" output on line 51 of FIG. 3, or a QUIT command from the PC, will appear on line 69 and will return the armed logic 64 to the idle state. Also, if no trigger occurs in the present frame, as will be explained, or if an EOF occurs before a trigger occurs, the armed logic 64 will return to the idle state.

Once armed, and before a return to idle, a trigger state machine 70 controls the injection of a transmission error into the optic stream until a trigger or no trigger is detected.

A "mask" FIFO 72 and an "expected" FIFO 73 are loaded from the PC test case at interface 25. The words contain the selected pattern which is the trigger information. The mask FIFO 72 output is ANDed 76 with the decoded data and the expected FIFO 73 output is compared with the decoded data by comparator 78 after it passes through the mask AND 76. The FIFO outputs are clocked by the trigger state machine 70 on line 79 each time a new decoded character is available.

The number of characters that are compared for the trigger is the same or less than the length of the FIFO delay by FIFO 46 in FIG. 3. For a typical test case, the length of the selected pattern to be recognized will be 16 characters or less. The mask FIFO 72 and the expected FIFO 73 each have logic to load each output word back to the input. Thus, if there is a "no compare" in one frame, the FIFOs are ready for comparison in the next frame. The trigger state machine 70, the FIFOs 72 and 73, comparator 78, and associated circuitry are another portion of the arm and trigger 48 of FIG. 3.

The trigger state machine 70 starts cycling when armed by armed logic 64. The trigger state machine checks that each decoded character matches the masked expected data (selected pattern) from the FIFOs 72 and 73. The number of consecutive characters that must match is selected by programming a counter of the trigger state machine. If the programmed number of consecutive characters match at comparator 78, the selected pattern is recognized and the trigger state machine 70 issues the injection signal on trigger line 80. If any character does not match, no injection occurs.

Alternative arrangements may be envisioned by those of skill in the art to accomplish the recognition, from the electrical input stream, of a selected event related to the optic stream defined protocol, and the recognition, in response to the recognition of the selected event, of a selected pattern of the electrical input stream.

Figure 5:
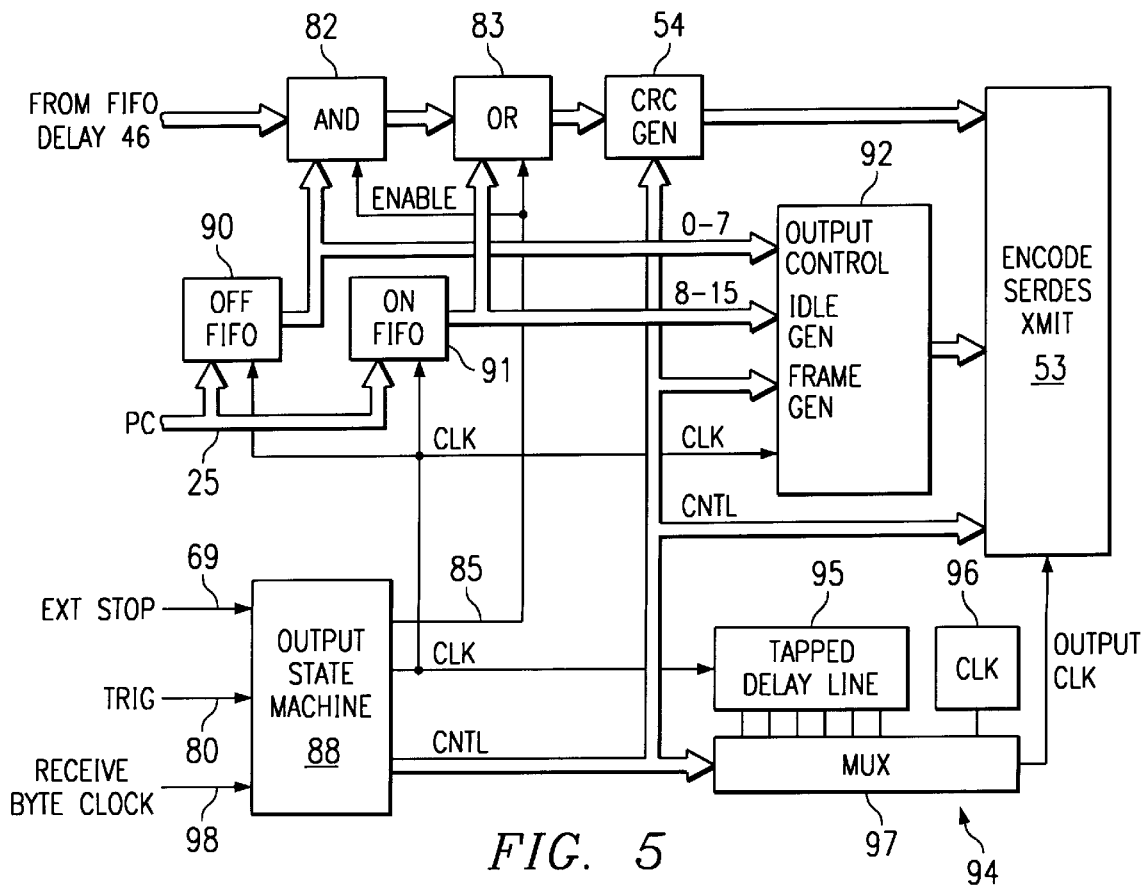
FIG. 5 is a block diagram of the error injection circuitry of the diagnostic error injection subsystem of FIGS. 1 and 3.

FIG. 5 illustrates an embodiment of the injecting arrangement for the injection, in response to the recognition of the selected pattern, of a transmission error into the optic stream.

The input data from the FIFO delay 46 is provided to an AND 82 and an OR 83, both gated by an Enable line 85. If the Enable is off, the input data from FIFO delay 46 is passed through to a transmitter 53 unchanged. Thus, in the absence of the selected pattern of the electrical input stream, the optic stream of the fiber is retransmitted to the target without modification.

If the selected pattern is detected in the electrical input stream, the trigger signal on line 80 activates an output state machine 88. Once the trigger is activated, the output state machine starts a trigger delay counter which counts a programmed number of characters, so that the error injection begins at a selected point in the FIFO delayed input stream. The programmed number is provided from the PC. When the programmed number of characters is counted, the output state machine operates the Enable line 85. The error to be injected is provided from the PC 25 to Off FIFO 90 and On FIFO 91, which feed the AND 82 and the OR 83, respectively. The Off FIFO 90 may, for example, be 14 bits wide, whereas the AND 82 is 10 bits wide. The On FIFO 91 may, for example, be 10 bits wide, as is the OR 83. The first 8 bits may comprise data, and the 9th bit allows delimiters to be generated and the 10th bit allows 10 bit code points to be generated, to generate errors as though the 8/10 encoder were malfunctioning. The extra 4 bits of the Off FIFO 90 operates an output control 92. In one example, the Off FIFO operates the output control to conduct a bypass which puts the encoder of the transmitter 53 in bypass mode, allowing the 10 bit error injection to be passed directly to the transmitter. In another example, the output control 92 is operated to inhibit output transmissions from the SERDES of the transmitter 53, simulating loss of light. In still another example, the phase of the clock to the SERDES is changed. In another example, an IDLE generator of the output control 92 is operated to pad the record with IDLEs.

The external stop input 69 is also provided to the output state machine 88 to abort any error insertion upon the detection of an error in the input stream.

The output state machine controls the length of the error injection. For example, an 8 bit stop counter counts the number of erroneous characters provided by Off FIFO 90 and On FIFO 83, and when the counter expires, the Enable 85 is turned off. Alternatively, the stop counter waits for an EOF in the delayed input data, then starts counting characters. Still alternatively, the stop counter waits for the fall of the continuous sequence detector 66 of the undelayed data and then starts counting characters. As a further alternative, the PC input 25 may command that the error injection be stopped.

The CRC generator 54 may be operated to generate a CRC on the stream including the injected error as though the injected error was created by the source 17 in FIG. 1. Alternatively, not operating the CRC generator 54 when an error is injected will cause a CRC error (and a code violation).

An output clock generator 94 is provided which may comprise a tapped delay line 95, a clock 96 and a multiplexor 97. A receive byte clock signal is received on line 98 from the deserializer of the SERDES of receiver 60 and passed to the tapped delay line 95. The multiplexor 97 selects a tap to selectively phase shift the receive byte clock. The shifted clock is provided to the transmit SERDES of transmitter 53 which drives the 8/10 encoder and serializer. Thus, clock signals are continually provided even though receive byte clock signals may be missed at the receiver 60. Additionally, a separate clock 96 may be used to establish the clocking of the transmitter 53, for example to provide an error injection of erroneous frames.

Figure 6:
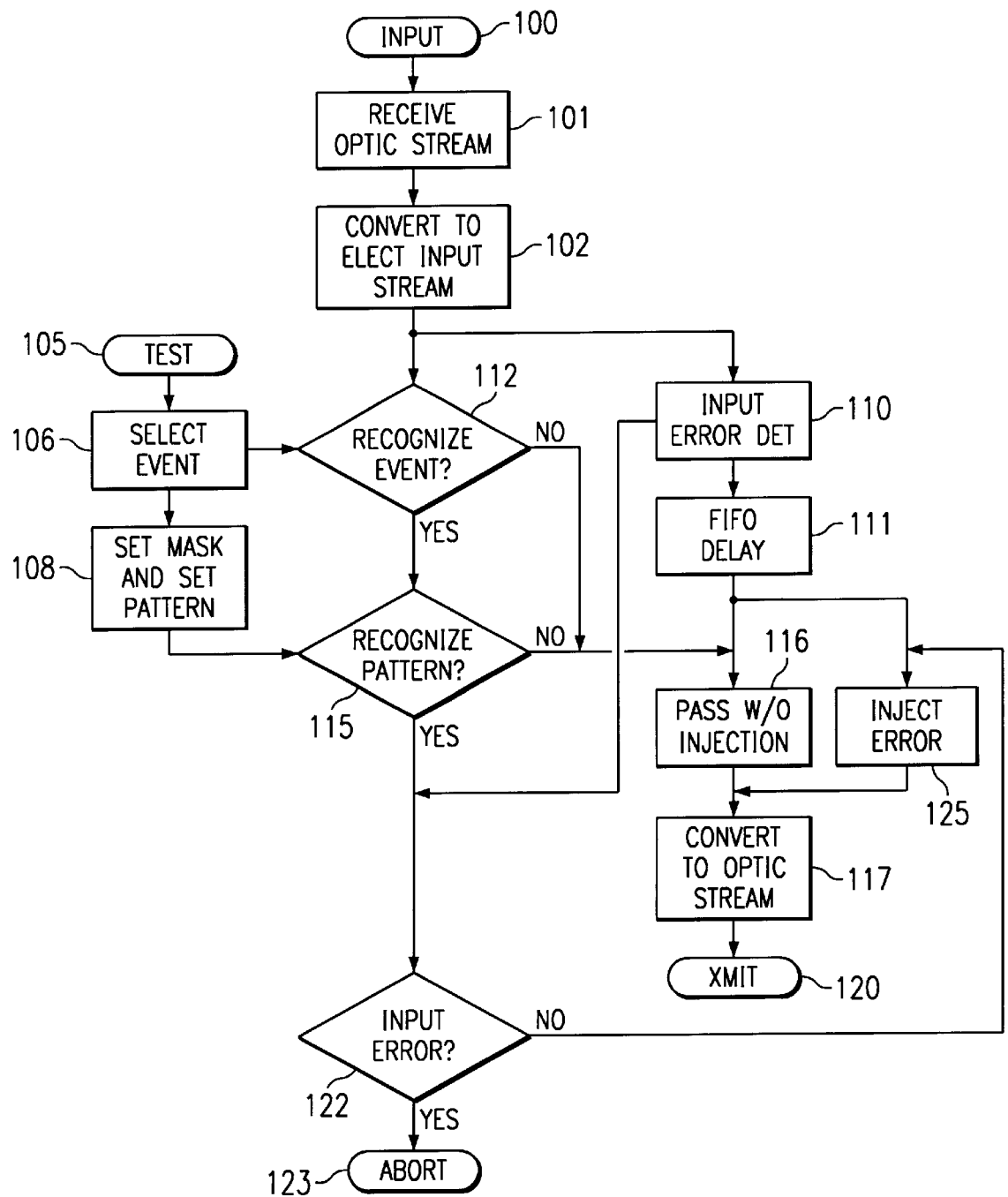
FIG. 6 is a flow chart depicting an embodiment of the error injection method of the present invention.

An embodiment of the method of the present invention is illustrated in FIG. 6. At input 100, the error injection subsystem is in idle mode, receiving the optic stream 101 (from source 17 in FIG. 1) and converting 102 the serial optic stream to a parallel electrical input stream and decoding the 10 bit encoded data to 8 bits.

The test 105 is initiated by the PC or workstation 25 of FIG. 1, and establishes the criteria for step 106 which looks for a selected event related to the optic stream defined protocol. The subsystem is then in arming mode as operated by armed logic 64 in FIG. 4. The test 105 also establishes the criteria for step 108 which sets the mask and sets the pattern of the mask FIFO 72 and expected FIFO 73 in FIG. 4, which looks for the selected pattern. The decoded electrical input stream from step 102 is constantly checked for an input error in step 110 (various error checks represented by block 44 in FIG. 3) and delayed on a FIFO basis in step 111 (FIFO delay 46 in FIG. 3). The decoded electrical input stream from step 102 is also compared, in step 112, to the selected event defined in step 106, by armed logic 64 of FIG. 4. If the selected event is recognized in step 112, armed logic 64 signals the trigger state machine 70 of FIG. 4. Step 115 then looks at the mask and pattern of step 108 at comparator 78 of FIG. 4. If the pattern is recognized, the transmission error will be injected unless there is an input error.

If the selected event is not recognized in step 112, or, if an event is recognized, but the selected pattern is not recognized in step 115, step 116 passes the input stream without injection of an error, and in step 117 converts the delayed electrical stream to an optic stream at transmitter 53 of FIG. 3, thereby retransmitting the optic stream of the fiber to the target (at output 18 of FIG. 3) without modification in step 120.

If the selected event is recognized in step 112 and the selected pattern is recognized in step 115, the input error detection step 110 is constantly monitored in step 122 and any input error that is detected in step 110 causes the error injection to be aborted in step 123.

Without an input error, the selected transmission error is injected into the delayed input stream (from step 111) in step 125 by the arrangement of FIG. 5. The delayed input stream and the injected error are converted to an encoded, deserialized, optical stream in step 117 and transmitted to the target in step 120, at transmitter 53 on output 18 of FIG. 3.

Thus, the diagnosis of FIG. 6, comprises receiving the fiber optic stream and converting the fiber optic stream to an electrical input stream with a FOSA (fiber optic subassembly), and recognizing, from the electrical input stream, a selected event related to the optic stream defined protocol. Then, in response to the recognition of the selected event, recognizing a selected pattern of the electrical input stream, preferably employing mask logic, and injecting, in response to the recognition of the selected pattern, a transmission error into the optic stream, and transmitting the optic stream with the injected transmission error to the target, employing a FOSA.

A FIFO delay buffers the electrical input stream, and the mask logic injects the transmission error at a selected point in the FIFO delayed optic stream.

Many examples of tests initiated by the PC 25 may be envisioned by those skilled in the art.

As one example, the diagnosis may look at a SCSI input stream in step 112 for the frame control field value that indicates the first sequence of an exchange. When recognized, step 115 may look at the input stream in the SCSI header for a SCSI command and a particular value in the SCSI Command Descriptor Block corresponding to a selected command (example "2A —WRITE10"). Step 125 may inject the transmission error, substituting the command to an undefined value, and operating the CRC for the frame so that it appears that the initiator sent an invalid command.

As another example, the diagnosis may look, in step 112, for the frame control field that indicates a solicited data frame, and step 115 identifies a byte of data which is changed by substitution in step 125, without correcting the CRC for the frame. This will cause a CRC error and a code violation.

In still another example, steps 112 and 115 look for a Link Reset Response ordered set, which step 125 changes to IDLE.

A listing of some other examples of injected errors includes:

Data in a frame is replaced with a delimiter;

Data or a delimiter is modified to cause an 8/10 code error, such as setting up a DC bias in the signal;

Replace part of a frame with IDLEs so that it appears as though some of the data or delimiters was lost;

Replace all of a frame, such as an acknowledgment frame, with IDLEs so that it appears that a frame was lost;

Provide no signal output for all or part of a frame, for example, with a millisecond loss the target would expect the signal to come back, but if seconds are lost the target would expect that the signal was lost;

A delimiter (SOF or EOF) may be modified;

Replace all or part of a frame with a continuous sequence, or one continuous sequence with another;

Inhibit output transmission for a programmable length of time (loss of light);

Change the phase of the transmitter clock, which if changed enough will cause a loss of synchronization in the downstream receiver, or if varied back and forth a little will simulate jitter;

In RECYCLE mode, the same error is forced in every frame that satisfies the trigger condition, putting the same error on over and over; and Employ the FIFO delay to simulate various cable lengths and signal delays.

Again, those of skill in the art will be able to envision additional errors for injection into the optical stream in accordance with the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for diagnosing a fiber optic network, said fiber optic network comprising a fiber having an optic stream adhering to a defined protocol of said fiber optic network, and comprising a target for receiving and responding to said optic stream, comprising the steps of:

receiving said fiber optic stream and converting said fiber optic stream to an electrical input stream;

recognizing, from said electrical input stream, a selected event related to said optic stream defined protocol;

recognizing, in response to said recognition of said selected event, a selected pattern of said electrical input stream;

injecting, in response to said recognition of said selected pattern, a transmission error into said optic stream; and transmitting said optic stream with said injected transmission error to said target.

2. The method of claim 1, additionally comprising the step of:

in the absence of said selected pattern of said electrical input stream, retransmitting said optic stream of said fiber to said target without modification.

3. The method of claim 2, wherein said injecting step comprises:

injecting said transmission error into said electrical input stream at the location in said electrical input stream of said recognized selected pattern; and converting said electrical input stream to an optical stream.

4. The method of claim 3, wherein said error injection comprises substituting said transmission error for a selected portion of said electrical input stream at said location.

5. The method of claim 3, additionally comprising the step of:

aborting said injection step upon said fiber optic stream having an error.

6. The method of claim 2, additionally comprising the step of:

FIFO buffering said electrical input stream, whereby said injecting step may inject said transmission error at a selected point in said electrical input stream at or prior to said selected pattern; and converting said electrical input stream to an optical stream.

7. The method of claim 6, wherein said injecting step comprises:

injecting said transmission error into said buffered electrical input stream at the location in said electrical input stream of said recognized selected pattern.

8. The method of claim 6, additionally comprising the step of:
  aborting said injecting step upon said fiber optic stream having an error.

9. The method of claim 6, wherein said step of recognizing said selected pattern comprises comparing said buffered electrical input stream to a preset value enabled by a mask.

10. The method of claim 2, wherein said error injecting step transmission error comprises changing a command of said electrical input stream and updating the CRC for said electrical input stream including said changed command.

11. The method of claim 2, wherein said error injecting step transmission error comprises substituting idle characters for a portion of said electrical input stream.

12. A method for diagnosing a fiber optic network, said fiber optic network comprising a fiber having an optic stream adhering to a defined protocol of said fiber optic network, and comprising a target for receiving and responding to said optic stream, comprising the steps of:
  receiving said fiber optic stream and converting said fiber optic stream to an electrical input stream;
  recognizing, from said electrical input stream, a selected event related to said optic stream defined protocol;
  recognizing, in response to said recognition of said selected event, a selected pattern of said electrical input stream;
  injecting, in response to said recognition of said selected pattern, a transmission error into said electrical input stream;
  converting said electrical input stream to an optic stream; and
  transmitting said optic stream to said target.

13. The method of claim 12, additionally comprising the step of:
  in the absence of said selected pattern of said electrical input stream, retransmitting said optic stream of said fiber to said target without modification.

14. The method of claim 13, wherein said error injecting step transmission error comprises altering the phase of said optic stream.

15. The method of claim 13, wherein said error injecting step transmission error comprises altering the timing of said optic stream.

16. The method of claim 13, additionally comprising the step of:
  aborting said injecting step upon said fiber optic stream having an error.

17. A diagnostic subsystem inserted in a fiber optic network, said fiber optic network comprising a fiber having an optic stream adhering to a defined protocol of said fiber optic network, and comprising a target for receiving and responding to said optic stream, comprising:
  a first fiber optic subassembly for converting said fiber optic stream to an electric input stream;
  a comparator coupled to said fiber optic subassembly for recognizing, from said electrical input stream, a selected event related to said optic stream defined protocol;
  mask logic coupled to said comparator for recognizing, in response to said recognition of said selected event, a selected pattern of said electrical input stream and for injecting, in response to said recognition of said selected pattern, a transmission error into said optic stream; and
  a second fiber optic subassembly coupled to said mask logic for transmitting said optic stream with said injected transmission error to said target.

18. The diagnostic subsystem of claim 17, additionally comprising a FIFO buffer coupled to said first fiber optic subassembly for buffering said electrical input stream, and wherein said mask logic is coupled to said FIFO buffer for injecting said transmission error at a selected point in said optic stream.

19. The diagnostic subsystem of claim 18, wherein said optic stream data is encoded in an (8,10) code, and wherein said first fiber optic subassembly additionally comprises a decoder for decoding said optic 10 bit code to an 8 bit code, and said second fiber optic subassembly additionally comprises an encoder for encoding said 8 bit code to said optic 10 bit code.

20. The diagnostic subsystem of claim 19, wherein said first fiber optic subassembly additionally comprises a deserializer for converting said optic stream to a parallel electrical input stream, and said second fiber optic subassembly additionally comprises a serializer for converting said electrical input stream to a serial optic stream.

\* \* \* \* \*